United States Patent  
Byun et al.

(10) Patent No.: US 7,791,769 B2
(45) Date of Patent: Sep. 7, 2010

(54) METHOD FOR PROVIDING FILM IMAGE AND IMAGE DISPLAY APPARATUS PROVIDING THE FILM IMAGE

(75) Inventors: Jeong-moon Byun, Suwon-si (KR); Tae-hong Jeong, Yongin-si (KR); Sang-jin Lee, Seoul (KR); Won-seok Ahn, Seoul (KR); Se-jin Pyo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1073 days.

(21) Appl. No.: 11/494,732

(22) Filed: Jul. 28, 2006

(65) Prior Publication Data

US 2007/0165251 A1 Jul. 19, 2007

(30) Foreign Application Priority Data

Jan. 17, 2006 (KR) .................. 10-2006-0004834

(51) Int. Cl.
*H04N 1/04* (2006.01)
(52) U.S. Cl. .................. 358/474; 358/1.9; 358/487; 358/447; 358/475; 358/509; 348/448; 348/447; 348/459; 348/231.9; 348/97; 396/311; 396/512
(58) Field of Classification Search .................. 358/474, 358/1.9, 302, 310, 487, 505; 348/447, 231.99, 348/E7.003, E3.029, E9.01, 322, 312, 121, 348/97, 234, 446, 401, 911, 415; 396/56, 396/311, 448, 57, 319, 512
See application file for complete search history.

(56) References Cited

U.S. PATENT DOCUMENTS

| 4,965,628 | A | * | 10/1990 | Olliver et al. .................. 355/41 |
| 5,313,281 | A | | 5/1994 | Richards |
| 5,461,420 | A | | 10/1995 | Yonemitsu et al. |
| 5,497,199 | A | * | 3/1996 | Asada et al. ................. 348/446 |
| 5,726,737 | A | * | 3/1998 | Fredlund et al. .............. 355/40 |
| 5,831,673 | A | | 11/1998 | Przyborski et al. |

(Continued)

FOREIGN PATENT DOCUMENTS

EP    1 494 475 A1    1/2005

(Continued)

*Primary Examiner*—Negussie Worku
(74) *Attorney, Agent, or Firm*—Sughrue Mion, PLLC

(57) ABSTRACT

A method for providing a film image and an image display apparatus for providing the film image are provided. The method includes determining a scheme of an input image signal; if the input image signal is determined to be an interlaced image signal, converting the input image signal into a progressive image signal to generate a converted progressive image signal and converting a scanning rate the converted progressive image signal to generate an image signal having a selected scanning rate; if the input image signal is determined to be a progressive image signal, converting a scanning rate the input progressive image signal to generate the image signal having the selected scanning rate; and converting a color characteristic of the image signal having the selected scanning rate into an image signal having a color characteristic related to a selected type of a film. Accordingly, a general image can be viewed which has a similar effect to when a film image is projected on a screen.

19 Claims, 4 Drawing Sheets

U.S. PATENT DOCUMENTS

| | | | |
|---|---|---|---|
| 5,990,982 A * | 11/1999 | Gove et al. | 348/750 |
| 6,040,869 A * | 3/2000 | Dischert | 348/448 |
| 6,055,018 A * | 4/2000 | Swan | 348/448 |
| 6,141,056 A * | 10/2000 | Westerman | 348/448 |
| 6,262,773 B1 * | 7/2001 | Westerman | 348/448 |
| 6,341,200 B1 * | 1/2002 | Nakanishi et al. | 396/6 |
| 6,421,385 B1 * | 7/2002 | Uenoyama et al. | 375/240.2 |
| 6,526,098 B1 * | 2/2003 | Kato et al. | 375/240.24 |
| 6,778,428 B2 * | 8/2004 | Joo | 365/158 |
| 6,987,215 B1 * | 1/2006 | Maliga et al. | 800/298 |
| 6,993,073 B2 * | 1/2006 | Foong et al. | 375/240.03 |
| 7,158,186 B2 * | 1/2007 | Selby et al. | 348/459 |
| 2002/0118296 A1 * | 8/2002 | Schwab et al. | 348/441 |
| 2002/0136293 A1 * | 9/2002 | Washino | 375/240.01 |
| 2003/0156301 A1 * | 8/2003 | Kempf et al. | 358/486 |
| 2003/0189100 A1 * | 10/2003 | Yamada et al. | 235/470 |
| 2004/0239803 A1 * | 12/2004 | Selby et al. | 348/459 |
| 2007/0177034 A1 * | 8/2007 | Kim | 348/231.99 |

FOREIGN PATENT DOCUMENTS

| | | |
|---|---|---|
| JP | 2000-228762 A | 8/2000 |
| KR | 10-2002-0003010 A | 1/2002 |
| KR | 10-2004-0023011 A | 3/2004 |
| WO | 2004/095829 A1 | 11/2004 |

* cited by examiner

METHOD FOR PROVIDING FILM IMAGE AND IMAGE DISPLAY APPARATUS PROVIDING THE FILM IMAGE

CROSS-REFERENCE TO RELATED APPLICATIONS

This application claims priority from Korean Patent Application No. 10-2006-0004834 filed in the Korean Intellectual Property Office on Jan. 17, 2006, the entire content of which is incorporated herein by reference.

BACKGROUND OF THE INVENTION

1. Field of the Invention

The present invention relates to a method for providing a film image and an image display apparatus for providing the film image. More particularly, the present invention relates to a method for providing a film image and an image display apparatus thereof that converts an image, which is not photographed on film, into a progressive image of a low scanning rate, simultaneously converting the image into a film image with a color characteristic and a spatial change emulating unique characteristic of an actual film image provided through a film projector.

2. Description of the Related Art

An image display apparatus displays an image corresponding to an image signal input from an exterior, and an image stored in a recording medium. Generally, the image display apparatus includes video cassette recorder (VCR), digital versatile disk (DVD) player, a compact disk (CD) player, a hard disk drive (HDD) player, a camcorder, a mobile phone, a personal digital assistant (PDA), a digital television (DTV), a set-top box, and a personal computer (PC).

The image display apparatus can provide an image, which is not photographed on a film, but corresponds to an image signal input from an exterior and is stored in a recording medium, as a film image that emulates an actual film image.

FIG. 1 is a block diagram of a related art image display apparatus for providing a film image. Referring to FIG. 1, the related art image display apparatus comprises a start part 101, an analog signal conditioning part 102, an analog-to-digital (A/D) converter 103, a timing/controller 104, a memory 105, a post conditioning part 106, and a digital-to-analog (D/A) converter 107.

The start part 101 captures an input image, and converts the captured image into an interlaced analog signal. The analog signal conditioning part 102 converts the interlaced analog signal into a progressive analog signal. The A/D converter 103 converts the progressive analog signal into a progressive digital signal. The timing/controller 104 provides timing signals to each member, and separates the progressive digital image signal into an odd-numbered field and an even-numbered field according to a frame rate of film to store into the memory 105. The post conditioning part 106 modifies the interlaced digital image signal output from the memory 105 to have a unique color characteristic of film, and the D/A converter 107 converts the color characteristic-modified, interlaced digital image signal into an analog image signal to output.

The image display apparatus for providing a film image has the post conditioning part 106, which reproduces the unique color characteristic of film, disposed at the end of the memory 105 so that the interlaced image signal output from the memory 105 repeatedly passes through the post conditioning part 106. Accordingly, unnecessary processing occurs.

The image signal stored in the memory 105 is output according to an interlaced scheme so that interlaced-to-progressive conversion (IPC) should be performed to display image data according to a progressive scheme. Accordingly, original image signal may be deteriorated.

Furthermore, the related art image display apparatus for providing a film image utilizes an analog input and an analog output, and therefore, D/A conversion, and A/D conversion should be performed to provide a digital image signal to a device requesting the digital image signal input such that image signal may be deteriorated.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for providing a film image, and an image display apparatus providing the film image that can be applied to a digital device and minimize unnecessary processing.

The present invention also provides a method for providing a film image and an image display apparatus providing the film image so that a deterioration of original image signal can be minimized.

According to an aspect of the present invention, there is provided a method for providing a film image including determining a scheme of an input image signal to output a control signal to provide the input image signal depending on a selected format, converting an interlaced input image signal into a progressive image signal according to the control signal, converting one of the progressive input image signal and the converted progressive image signal into an image with a selected scanning rate according to the control signal, and converting the image signal, the scanning rate of which is converted, into an image with a color characteristic related to a type of a selected film.

The method may further include storing the image signal, the color characteristic of which is converted, and outputting the stored image signal to one of the interlaced image signal and the progressive image signal according to the control signal.

The converting the color characteristic includes operations of converting the image signal into a photosensitive energy signal of film according to a spectral sensitivity characteristic related to the selected film type, converting the converted photosensitive energy signal of the film into a film density unit signal according to a tone characteristic related to the selected film type, and adding a film grain to reproduce a texture and a noise of a film, and converting the converted film density signal into a driving data value unit signal of a display according to projection parameters.

The method may further include processing a de-gamma correction for the image signal, which is a non-linear RGB image, to convert into a linear RGB image signal, and processing a gamma correction for the data value unit signal to convert into a digital image signal to reproduce a film color characteristic.

The selected format may include at least one of the scanning rate, the type of the film, and the scheme of the output image signal, and the format may be selected by a user or the mode controller.

The scanning rate may include at least one of 24 frames per second and 30 frames per second.

According to another aspect of the present invention, there is provided an image display apparatus for providing a film image, the apparatus including an interlaced-to-progressive converter (IPC) which converts an interlaced input image signal into a progressive image signal, a film motion creator which converts one of the progressive input image signal and the converted progressive image signal into an image with a selected scanning rate, a film color converter which converts the image signal, the scanning rate of which is converted, into an image with a color characteristic related to a type of a selected film, and a mode controller which determines a scheme of an input image signal and outputs a control signal to output the input image signal to one of the IPC and the film motion creator and to provide the input image signal depending on a selected format, The apparatus may further include a memory which stores the image signal, the color characteristic of which is converted, and a film image output controller which outputs the image signal stored in the memory to one of the interlaced image signal and the progressive image signal according to the control signal.

The film color converter may include a film energy converter which converts the image signal into a photosensitive energy signal of film according to a spectral sensitivity characteristic related to the selected film type, a film tone converter which converts the converted photosensitive energy signal of the film into a film density unit signal according to a tone characteristic related to the selected film type, and adds a film grain to reproduce a texture and a noise of a film, and a film projection converter which converts the converted film density signal into a driving data value unit signal of a display according to projection parameters, and a film characteristic parameter register which stores at least one of the spectral sensitivity characteristic parameter, the tone characteristic parameter and the projection parameter.

The apparatus may further include a de-gamma converter which processes a de-gamma correction for the image signal, which is a non-linear RGB image, to convert into a linear RGB image signal, and a gamma converter which processes a gamma correction for the data value unit signal, which is converted by the film projection converter, to convert into a digital image signal to reproduce a film color characteristic.

The selected format may include at least one of the scanning rate, the type of the film, and the scheme of the output image signal, and the format is selected by a user or the mode controller.

The scanning rate may include at least one of 24 frames per second and 30 frames per second.

To achieve the above-described objects, there is provided a film color conversion apparatus for providing a film image, the apparatus including a film energy converter which converts an image signal into a photosensitive energy signal according to a spectral sensitivity characteristic corresponding to a type of the selected film, a film tone converter which converts the converted photosensitive energy signal of film into a film density unit signal according to tone characteristic corresponding to the type of the selected film, a film projection converter which converts the converted film density signal into a driving data value unit signal of display according to a projection parameter, and a film characteristic parameter register which stores at least one of the spectral sensitivity characteristic parameter, the tone characteristic parameter and the projection parameter.

The apparatus may further include a film grain effect part which adds a film grain to reproduce a texture and a noise of a film into the image signal.

According to another aspect of the present invention, there is provided a film color conversion method for providing a film image, the method including operations of converting an image signal into a photosensitive energy signal according to a spectral sensitivity characteristic corresponding to a type of the selected film, converting the converted photosensitive energy signal of film into a film density unit signal according to tone characteristic corresponding to the type of the selected film, and converting the converted film density signal into a driving data value unit signal of display according to a projection parameter.

The method may further include an operation of adding a film grain to reproduce a texture and a noise of a film into the image signal.

According to another aspect of the present invention, there is provided an image display apparatus for providing a film image including a film motion creator which converts in input image signal into an image with a selected scanning rate, a film color converter which converts the image signal, the scanning rate of which is converted, into a color characteristic related to a type of selected film, and a mode controller which outputs a control signal to output the input image signal to the film motion creator and to provide the input image signal as a film image depending on a selected format.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
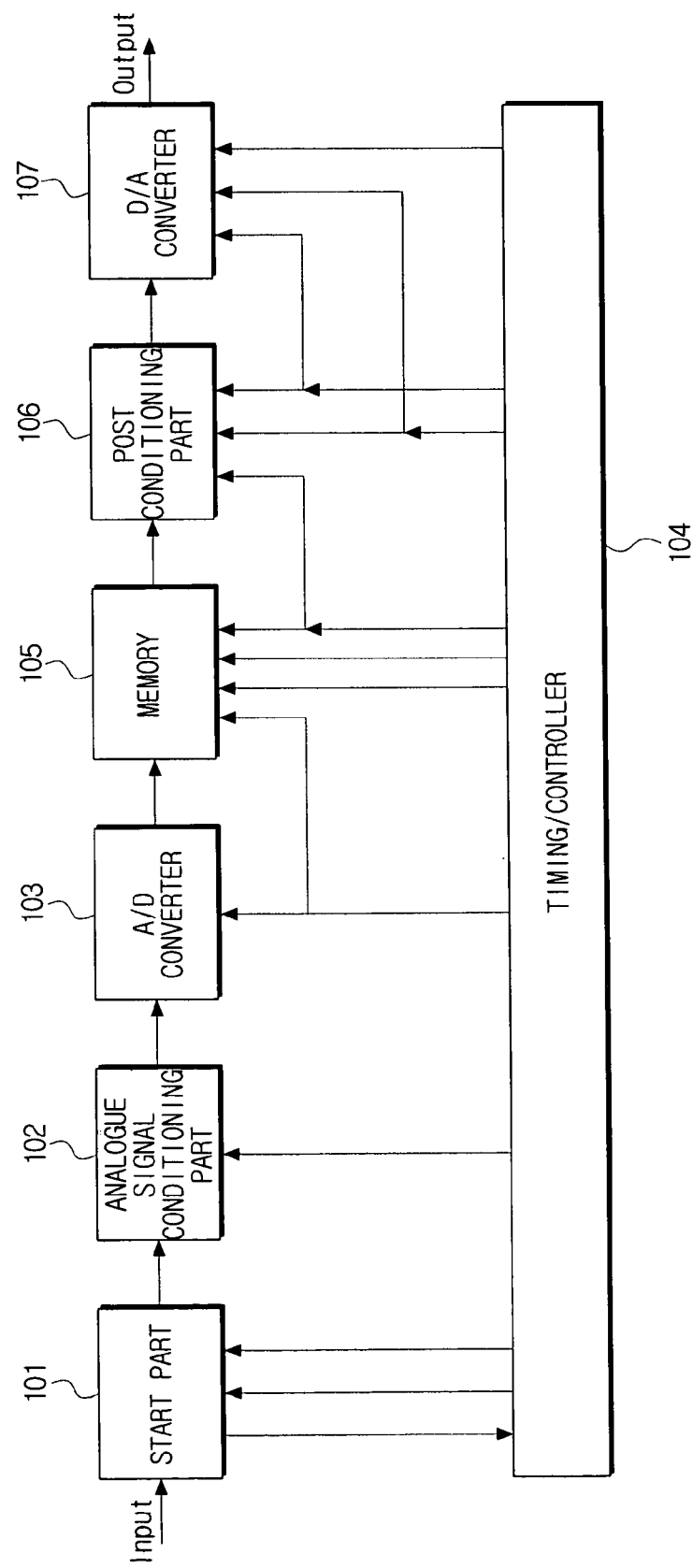
FIG. 1 is a block diagram of a related art image display apparatus providing a film image.

Exemplary embodiments of the present invention will be described in detail with reference to the drawings. In the drawings, the same elements are denoted by the same reference numerals throughout the drawings. In the following description, detailed descriptions of known functions and configurations incorporated herein have been omitted for conciseness and clarity.

Figure 2:
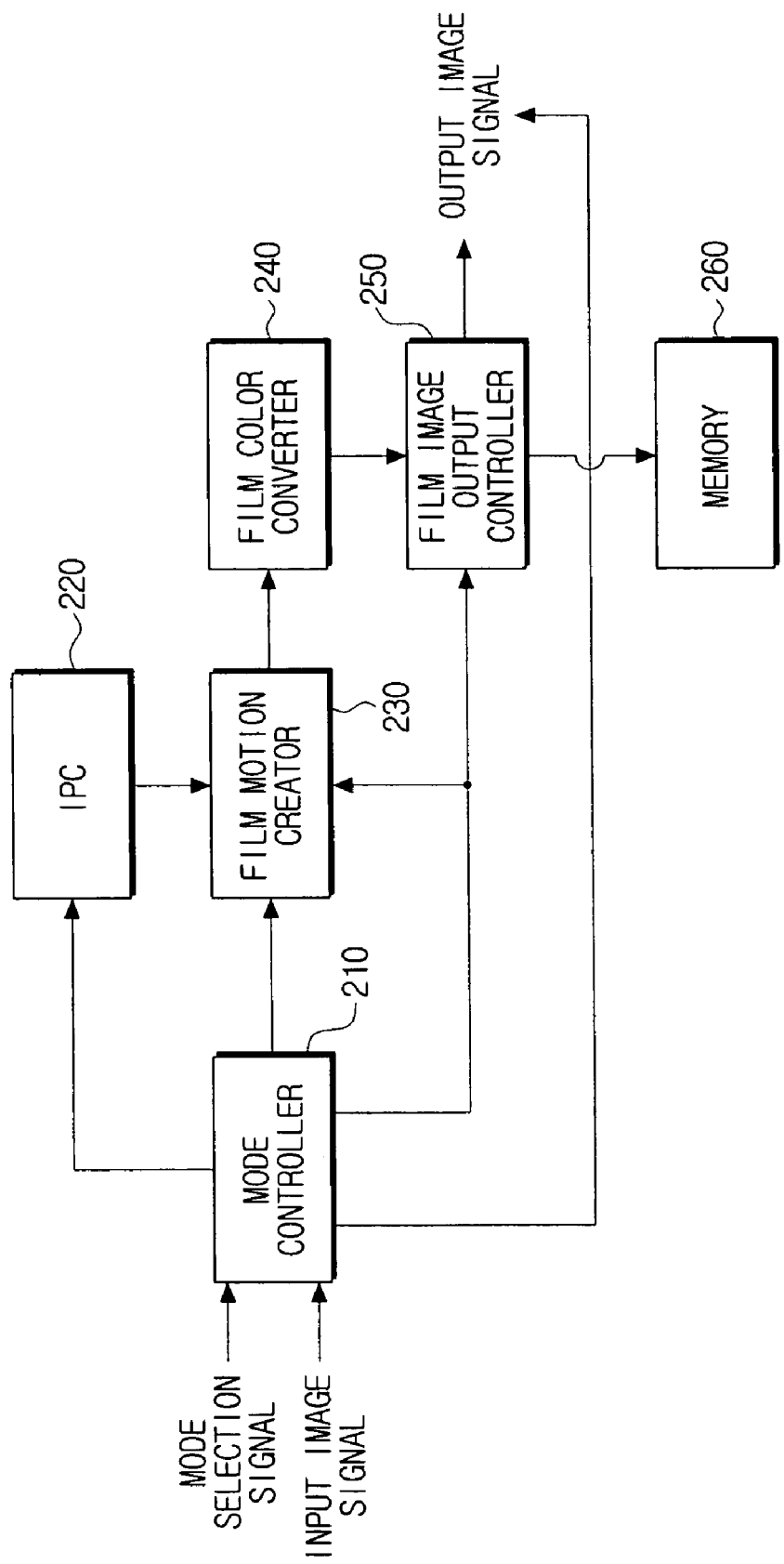
FIG. 2 is a block diagram of an image display apparatus according to an exemplary embodiment of the present invention.

FIG. 2 is a block diagram of an image display apparatus according to an exemplary embodiment of the present invention.

The image display apparatus converts an image, which is not photographed on a film, into a progressive image of a low scanning rate and simultaneously changes the image to have a color and a spatial change emulating unique characteristic of a film image so that a film image emulating the characteristic of an actual film image through a film projector, can be provided.

Referring to FIG. 2, the image display apparatus comprises a mode controller 210, an interlaced-to-progressive conversion (IPC) 220, a film motion creator 230, a film color converter 240, and a film image output controller 250.

The mode controller 210 controls the IPC 220, the film motion creator 230, the film color converter 240, and the film image output controller 250 to provide an input image signal as a film image. In detail, the mode controller 210 receives a mode selection signal and an input image signal, and if the input image signal is "general image", it outputs a control signal to convert the input image signal into a film image. In other words, if the input image signal is "film image", the mode controller 210 outputs the input image signal as unchanged, and only if the input image signal is "general image", it causes the image to be converted so that the image can have the characteristic of an image photographed on a film, in order to prevent repeated film processing. The input mode selection signal is used for determining whether the output image signal is to have an interlaced scheme or a progressive scheme. The detailed control method of the mode controller 210 will be described later with reference to FIG. 3.

If the input image signal is an interlaced image signal, the IPC 220 converts the interlaced image signal into a progressive image signal according to the control signal of the mode controller 210.

If the input image signal is a progressive image signal, the film motion creator 230 spatially changes the progressive image signal, or the progressive image signal converted by the IPC 220, to have a unique characteristic of an image photographed on a film according to the control signal of the mode controller 210. In detail, the film motion creator 230 transmits the progressive image signal based on a frame rate of film according to the mode selection signal, that is, a scanning rate. For example, if an image signal is input at 60 frames per second, and the mode selection signal is "30 frames per second film image" mode, the film motion creator 230 counts the progressive image signal input at 60 frames per second according to a predetermined scheme and passes only the progressive image signal related to 30 frames per second. Therefore, the scanning rate decreases so that an unsmooth image can be provided which seems cut when changing frames like an actual film image photographed on a film.

The film color converter 240 changes the progressive image signal, the number of frame per second of which is converted by the film motion creator 230, to have a unique color characteristic of an actual film image photographed on a film. The detailed operation of the film converter 240 will be explained later with reference to FIG. 4.

The film image output controller 250 stores the progressive image signal, the color characteristic of which is changed by the film color converter 240, into a memory 260. The film image output controller 250 outputs the image signal that is converted by the film motion creator 230 to conform with the output signal form according to the control signal of the mode controller 210.

Table 1 shows an example of the film image output controller 250 controlling the output image signal when the control signal of the mode controller 210 is a "24 frames per second film image" mode signal. The memory 260 may be divided into two areas (hereafter referred to as memory 1 and memory 2) to write frames, or two separate memories may be provided.

TABLE 1

| Memory 1 | | Frame 4 | | Frame 9 |
|---|---|---|---|---|
| Memory 2 | Frame 1 | | Frame 6 | |

As shown in Table 1, frames 4, 9, and so on, are written to memory 1, while frames 1, 6, and so on, are written to memory 2. Frames are read from the memories in order such that (1) frame 1 is read from memory 2 three times, (2) frame 4 is read from memory 1 three times, (3) frame 6 is read from memory 2 three times, (4) frame 9 is read from memory 1 three times, and so on. As a result, a total of 25 out of 60 frames are output in this way, and 35 frames are skipped. Because some frames, such as frames 2 and 3 between frames 1 and 4, are skipped, this causes the image to be displayed with a visual effect like a cut in film.

Table 2 shows an example of the film image output controller 250 controlling the output image signal when the control signal of the mode controller 210 is a "30 frames per second film image" mode signal.

TABLE 2

| Memory 1 | | Frame 3 | | Frame 7 |
|---|---|---|---|---|
| Memory 2 | Frame 1 | | Frame 5 | |

As shown in Table 2, frames 3, 7, and so on, are written to memory 1, while frames 1, 5, and so on, are written to memory 2. Frames are output in order such that (1) frame 1 is read twice from memory 2, (3) frame 3 is read twice from memory 1, (3) fame 5 is read twice from memory 2, (4) frame 7 is read twice from memory 1, and so on. As a result, 30 out of 60 frames are output, and 30 frames are skipped. Because some frames, such as frame 2 between frames 1 and 3, are skipped, this causes the image to be displayed with a visual effect like a cut in film.

If the control signal of the mode controller 210 is a signal requesting a progressive output image signal, the film image output controller 250 outputs a progressive image signal, and if the control signal is a signal requesting an interlaced output image signal, it may output an interlaced image signal.

Figure 3:
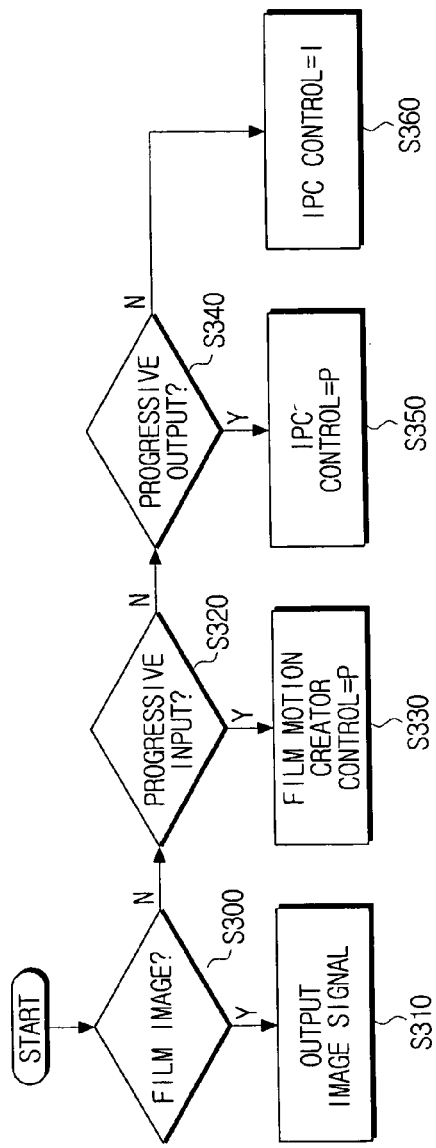
FIG. 3 is a flowchart of a method for controlling a mode controller of an image display apparatus according to an exemplary embodiment of the present invention.

FIG. 3 is a flowchart of a method for controlling a mode controller of an image display apparatus according to an exemplary embodiment of the present invention.

Referring to FIG. 3, the mode controller 210 determines if the input image signal is a film image (S300).

If the input image signal is determined to be a film image (S300-Y), the mode controller 210 outputs the input image signal to an output image signal without separate processing (S310).

If the input image signal is determined to be a non-film image, that is, a general image (S300-N), the mode controller 210 determines if the input image signal is a progressive image (S320).

If the input image signal is determined to be a progressive image (S320-Y), the mode controller 210 outputs the input image signal to the film motion creator 230, and outputs a "P" control signal to the film image output controller 250. The "P" control signal means that the selected output image signal is a progressive image signal (S330).

If the input image signal is determined to be a non-progressive image, that is, an interlaced image (S320-N), the mode controller 210 determines if the selected output image signal is a progressive image signal (S340). The type of the image signal may be selected by a user, or by the mode controller 210 according to characteristics of display.

If the selected output image signal is determined to be a progressive image signal (S340-Y), the mode controller 210 outputs the image signal to the IPC 220, and outputs the "P" control signal to the film image output controller 250 (S350).

If the selected output image is determined to be a non-progressive image signal, that is an interlaced image signal (S340-N), the mode controller 210 outputs the image signal to the IPC 220, and outputs an "I" control signal to the film image output controller 250. The "I" control signal means that the selected output image signal is an interlaced image signal (S360).

Figure 4:
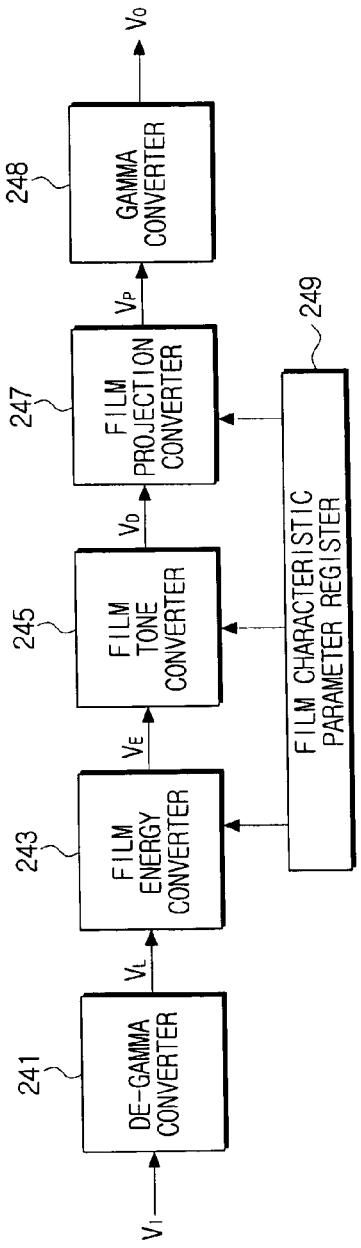
FIG. 4 is a detailed block diagram of a film color converter of an image display apparatus according to an exemplary embodiment of the present invention.

FIG. 4 is a detailed block diagram of a film color converter of an image display apparatus according to an exemplary embodiment of the present invention.

Referring to FIG. 4, the film color converter 240 comprises a de-gamma converter 241, a film energy converter 243, a film tone converter 245, a film projection converter 247, a gamma converter 248, and a film characteristic parameter register 249.

The de-gamma converter 241 performs a de-gamma correction on an image signal $V_I$ to convert the image signal $V_I$ into linear RGB image signal $V_L$. The image signal $V_I$ is non-linear RGB image, the number of frames per second of which is converted by the film motion creator 230.

The film energy converter 243 converts the linear RGB image $V_L$, which is output by the de-gamma converter 241, into a photosensitive energy signal $V_E$ according to a spectral sensitivity characteristic corresponding to a selected type of the film. The type of film may be selected by a user, or arbitrarily selected by the mode controller 210.

The film tone converter 245 converts the photosensitive energy signal $V_E$ of film, which is output by the film energy converter 243, into a $V_D$ signal, which is a density unit of film, according to a tone characteristic corresponding to a selected type of the film. At this time, the film tone converter 245 may add film grain to the film density signal $V_D$. The film grain reproduces unique texture and noise of film.

The film projection converter 247 converts the film density signal $V_D$, which is output by the film tone converter 245, into a $V_P$ signal, which is a driving data value of display, according to a projection parameter so that the film can have a characteristic like an actual film image projected through a film projector.

The gamma converter 248 performs a gamma correction on the $V_P$ signal, which is output by the film projection converter 247, to convert the $V_P$ signal into a digital image signal $V_O$ that reproduces a film color characteristic to output.

Film characteristic parameters according to the type of film are stored in the film characteristic parameter register 249. The film characteristic parameters includes spectral sensitivity characteristic parameter, tone characteristic parameter, and projection parameter.

In the present exemplary embodiment, the film tone converter 245 adds the film grain. However, the present invention is not limited in this manner. The film grain function may also be performed by the film projection converter 247. Alternatively, a separate member may be employed to perform the film grain function.

Figure 5:
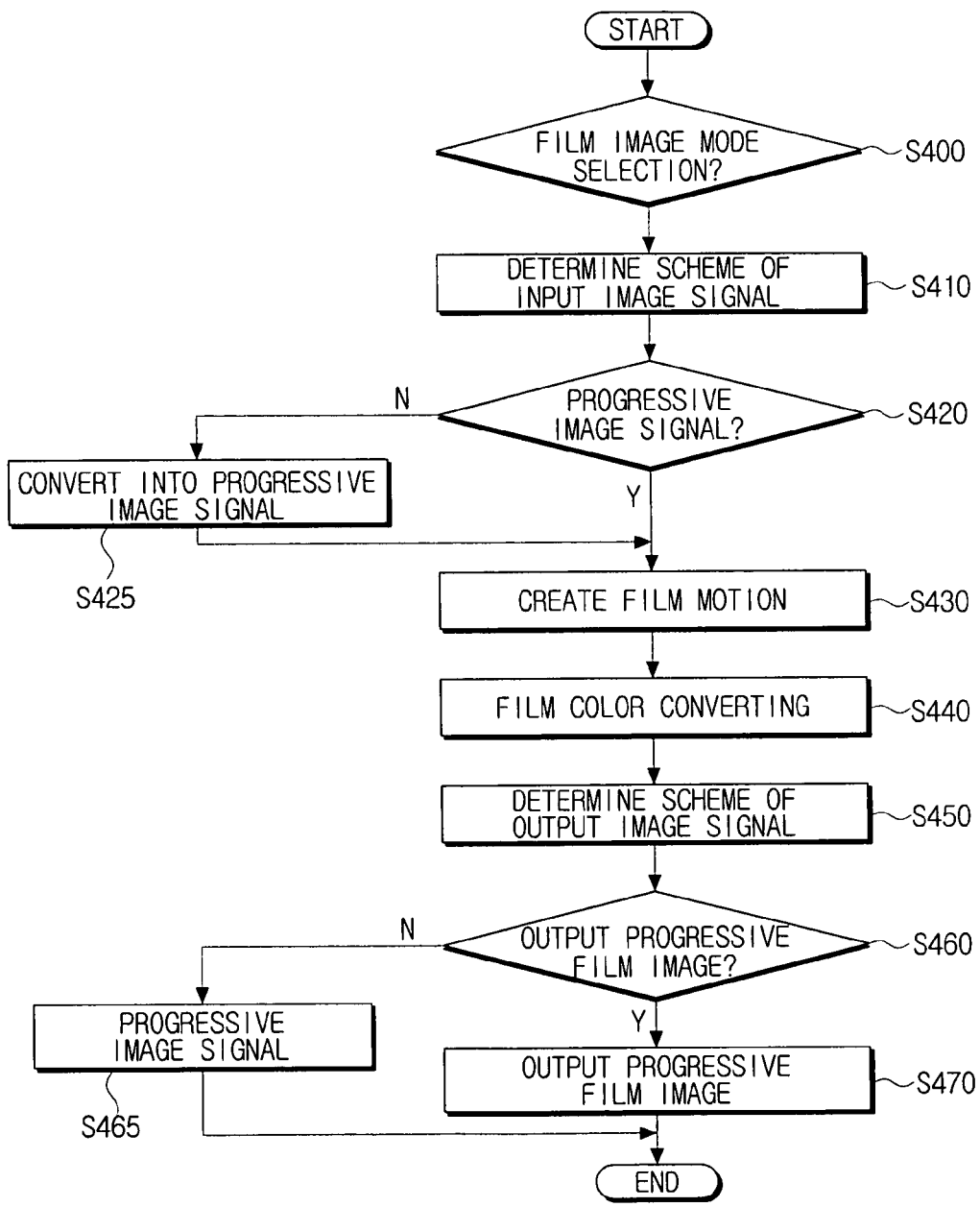
FIG. 5 is a flowchart of a method for providing a film image by an image display apparatus according to an exemplary embodiment of the present invention.

FIG. 5 is a flowchart of a method for providing a film image of an image display apparatus according to an exemplary embodiment of the present invention.

Referring to FIG. 5, the mode controller 210 determines if the film image mode is selected (S400). The selectable film image mode may include a "24 frames per second film image" mode and a "30 frames per second film image" mode. Here, the scanning rate may be selected by a user, or arbitrarily selected by the mode controller 210. The mode controller 210 determines if the input image signal is a film image, and receives an output scheme that a user desires.

If the film image mode is determined to be selected (S400-Y), the mode controller 210 determines the scheme of the input image signal (S410). In detail, the mode controller 210 determines whether the input image signal is a progressive image signal (S420).

If the input image signal is determined to be a non-progressive image signal (S420-N), the IPC 220 converts the input image signal into a progressive image signal by the control signal of the mode controller 210 (S425) and then the method proceeds to operation 430.

If the input image signal is determined to be a progressive image signal (S420-Y), the method proceeds to operation 430. In operation S430, the film motion creator 230 creates a film motion in the input image signal by the control signal of the mode controller 210 (S430). The film converter 240 converts the image signal, which is created as a film motion, into a film color (S440). The film motion creating and the film color converting have been explained with reference to FIGS. 2 and 4. Therefore, the detailed description thereof will be omitted.

The film image output controller 250 determines the scheme of a output image signal selected by the control signal of the mode controller 210 (S450). In detail, the film image output controller 250 determines whether the selected output image signal is a progressive image signal (S460). At this time, the film image output controller 250 determines the output image signal scheme, set by a user, by the control signal received from the mode controller 210.

If the selected output image signal is determined to be a non-progressive image signal (S460-N), the film image output controller 250 controls an interlaced image signal to be extracted and output from the progressive image signal by a predetermined scheme (S465).

In the operation S460, if the selected output image signal is determined to be a progressive image signal (S460-Y), the film image output controller 250 outputs a film image according to a progressive scheme (S470).

As described above, according to the exemplary embodiments of the present invention, a general image can be viewed which has a similar effect to when an image photographed on a film is projected on a screen. The method for providing a film image and an image display apparatus providing the film according to the exemplary embodiments of the present invention can be applied to various digital image display apparatuses, and minimize unnecessary processing so that the deterioration of original image can be minimized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing a film image by a processor, the method comprising:
   determining, by the processor, a scheme of an input image signal;
   if the input image signal is determined to be an interlaced image signal, converting the input image signal into a progressive image signal to generate a converted progressive image signal and converting a scanning rate of the converted progressive image signal to generate an image signal having a selected scanning rate;
   if the input image signal is determined to be a progressive image signal, converting a scanning rate of the input progressive image signal to generate the image signal having the selected scanning rate; and converting a color characteristic of the image signal having the selected scanning rate into an image signal having a color characteristic related to a selected type of a film.

2. The method as claimed in claim 1 further comprising:
storing the image signal having the color characteristic related to the type of the selected film; and
outputting the stored image signal as one of the interlaced image signal and the progressive image signal according to the determined scheme of image input signal.

3. The method as claimed in claim 1, wherein the converting the color characteristic comprises:
converting the image signal having the selected scanning rate into a photosensitive energy signal of the film according to a spectral sensitivity characteristic related to the selected type of the film;
converting the photosensitive energy signal of the film into a film density unit signal according to a tone characteristic related to the selected type of the film, and adding a film grain to the film density unit signal to reproduce a texture and a noise of the film; and
converting the film density unit signal into a driving data value unit signal of a display according to projection parameters.

4. The method as claimed in claim 1, wherein the converting the color characteristic comprises:
performing a de-gamma correction on the image signal having the selected scanning rate, which is a non-linear RGB image signal, to convert the image signal having the selected scanning rate into a linear RGB image signal;
converting the linear RGB image signal into a photosensitive energy signal of the film according to a spectral sensitivity characteristic related to the selected type of the film;
converting the photosensitive energy signal of the film into a film density unit signal according to a tone characteristic related to the selected type of the film, and adding a film grain to the film density unit signal to reproduce a texture and a noise of the film;
converting the film density unit signal into a driving data value unit signal of a display according to projection parameters; and
performing a gamma correction on the driving data value unit signal to convert the driving data value unit signal into a digital image signal to reproduce a film color characteristic.

5. The method as claimed in claim 1, wherein the scheme of the input image signal comprises at least one of the scanning rate, the type of the film, and a format of an output image signal, and at least one of the scanning rate, the selected type of the film, and the format of the output image signal is selected by a user or selected automatically.

6. The method as claimed in claim 1, wherein the scanning rate is one of 24 frames per second and 30 frames per second.

7. An image display apparatus for providing a film image, the apparatus comprising:
a mode controller which determines a scheme of an input image signal and generates a control signal based on the determined scheme of the input image signal;
an interlaced-to-progressive converter which converts an interlaced input image signal into a progressive image signal according to the control signal to generate a converted progressive image signal;
a film motion creator which converts a scanning rate of one of a progressive input image signal and the converted progressive image signal to generate an image signal having a selected scanning rate according to the control; and
a film color converter which converts a color characteristic of the image signal having the selected scanning rate to generate an image signal having a color characteristic related to a selected type of a film.

8. The apparatus as claimed in claim 7 further comprising:
a memory which stores the image signal having the color characteristic related to the selected type of the film; and
a film image output controller which outputs the image signal stored in the memory as one of the interlaced image signal and the progressive image signal according to the control signal.

9. The apparatus as claimed in claim 7, wherein the film color converter comprises:
a film energy converter which converts the image signal having the selected scanning rate into a photosensitive energy signal of the film according to a spectral sensitivity characteristic related to the selected type of the film;
a film tone converter which converts the photosensitive energy signal of the film into a film density unit signal according to a tone characteristic related to the selected type of the film, and adds a film grain to the film density unit signal to reproduce a texture and a noise of the film; and
a film projection converter which converts the film density unit signal into a driving data value unit signal of a display according to projection parameters; and
a film characteristic parameter register which stores at least one of the spectral sensitivity characteristic parameter, the tone characteristic parameter and the projection parameter.

10. The apparatus as claimed in claim 7, wherein the film color converter comprises:
a de-gamma converter which performs a de-gamma correction on the image signal having the selected scanning rate, which is a non-linear RGB image signal, to convert the image signal having the selected scanning rate into a linear RGB image signal;
a film energy converter which converts the linear RGB image signal into a photosensitive energy signal of the film according to a spectral sensitivity characteristic related to the selected type of the film;
a film tone converter which converts the photosensitive energy signal of the film into a film density unit signal according to a tone characteristic related to the selected type of the film, and adds a film grain to the film density unit signal to reproduce a texture and a noise of the film;
a film projection converter which converts the film density unit signal into a driving data value unit signal of a display according to projection parameters; and
a gamma converter which performs a gamma correction on the driving data value unit signal to convert the driving data value unit signal into a digital image signal to reproduce a film color characteristic.

11. The apparatus as claimed in claim 7, wherein the scheme comprises at least one of the scanning rate, the selected type of the film, and a format of an output image signal,
and at least one of the scanning rate, the selected type of the film, and the format of the output image signal is selected by a user or the mode controller.

12. The apparatus as claimed in claim 7, wherein the scanning rate is at least one of 24 frames per second and 30 frames per second.

13. A film color conversion apparatus for providing a film image, the apparatus comprising:
- a film energy converter which converts an image signal into a photosensitive energy signal according to a spectral sensitivity characteristic corresponding to a selected type of a film;
- a film tone converter which converts the photosensitive energy signal into a film density unit signal according to tone characteristic corresponding to the selected type of the film;
- a film projection converter which converts the film density unit signal into a driving data value unit signal of display according to a projection parameter; and
- a film characteristic parameter register which stores at least one of the spectral sensitivity characteristic parameter, the tone characteristic parameter and the projection parameter.

14. The apparatus as claimed in claim 13 further comprising a film grain effect part which adds a film grain to the film density unit signal to reproduce a texture and a noise of the film.

15. The apparatus as claimed in claim 13 further comprising:
- a de-gamma converter which performs a de-gamma correction on the image signal, which is a non-linear RGB image signal, to convert the image signal into a linear RGB image signal, wherein the film energy converter converts the linear RGB image signal into the photosensitive energy signal; and
- a gamma converter which performs a gamma correction on the driving data value unit signal to convert the driving data value unit signal into a digital image signal to reproduce a film color characteristic.

16. A film color conversion method for providing a film image using a processor, the method comprising:
- converting, by the processor, an image signal into a photosensitive energy signal according to a spectral sensitivity characteristic corresponding to a selected type of a film;
- converting the converted photosensitive energy signal of film into a film density unit signal according to a tone characteristic corresponding to the selected type of the film; and
- converting the converted film density signal into a driving data value unit signal of display according to a projection parameter.

17. The method as claimed in claim 16 further comprising adding a film grain to the film density unit signal to reproduce a film texture and a film noise of a the film.

18. The method as claimed in claim 16 further comprising:
- performing a de-gamma correction on the image signal, which is a non-linear RGB image signal, to convert the image signal into a linear RGB image signal, wherein in the converting the image signal into the photosensitive energy signal, the image signal is the linear RGB image signal; and
- performing a gamma correction on the driving data value unit signal to convert the driving data value unit signal into a digital image signal to reproduce a film color characteristic.

19. An image display apparatus for providing a film image, the apparatus comprising:
- a film motion creator which converts an input image signal into an image signal having a selected scanning rate;
- a film color converter which converts a color characteristic of the image signal having the selected scanning rate into an image signal having a color characteristic related to a selected type of a film; and
- a mode controller which outputs a control signal to output the input image signal to the film motion creator and to provide the input image signal as a film image depending on a selected format.

* * * * *